United States Patent [19]
Vutetakis et al.

[11] Patent Number: 6,162,559
[45] Date of Patent: *Dec. 19, 2000

[54] COMPRESSED BATTERY SYSTEM FOR MOTIVE POWER APPLICATIONS

[75] Inventors: David G. Vutetakis, High Point; Christopher R. Cestone, Winston-Salem; Stanley K. Wilkie, Lexington, all of N.C.

[73] Assignee: Douglas Battery Manufacturing Company, Winston - Salem, N.C.

[ * ] Notice: This patent issued on a continued prosecution application filed under 37 CFR 1.53(d), and is subject to the twenty year patent term provisions of 35 U.S.C. 154(a)(2).

[21] Appl. No.: 09/157,478

[22] Filed: Sep. 21, 1998

[51] Int. Cl.[7] .............................. H01M 2/02; H01M 10/02
[52] U.S. Cl. .......................... 429/100; 429/66; 429/183; 429/159
[58] Field of Search .................................... 429/100, 154, 429/155, 177, 204, 99, 66, 183

[56] References Cited

U.S. PATENT DOCUMENTS

| | | |
|---|---|---|
| Re. 23,644 | 4/1953 | Grant . |
| 2,956,100 | 10/1960 | Mendelsohn et al. . |
| 4,029,855 | 6/1977 | Dougherty et al. . |
| 4,114,260 | 9/1978 | DiGiacomo et al. . |
| 4,216,280 | 8/1980 | Kono et al. . |
| 4,383,011 | 5/1983 | McClelland et al. . |
| 4,425,412 | 1/1984 | Dittmann et al. . |
| 4,525,438 | 6/1985 | Pearson . |
| 4,525,926 | 7/1985 | Pearson . |
| 4,546,053 | 10/1985 | Sundberg . |
| 4,587,181 | 5/1986 | Gibson et al. . |
| 4,618,545 | 10/1986 | Clegg et al. . |
| 4,652,505 | 3/1987 | Komaki et al. . |
| 4,713,304 | 12/1987 | Rao et al. . |
| 4,743,270 | 5/1988 | McCartney, Jr. et al. . |
| 4,780,379 | 10/1988 | Puester . |
| 4,788,113 | 11/1988 | Bohle et al. . |
| 4,859,710 | 8/1989 | Ohmae et al. . |
| 5,075,184 | 12/1991 | Tanaka et al. . |
| 5,091,275 | 2/1992 | Brecht et al. . |
| 5,250,372 | 10/1993 | Willmann et al. . |
| 5,336,275 | 8/1994 | Zguris et al. . |
| 5,366,827 | 11/1994 | Belanger et al. ............... 429/99 |
| 5,376,477 | 12/1994 | Aidman et al. . |
| 5,384,211 | 1/1995 | Choi et al. . |
| 5,401,279 | 3/1995 | Eisenhut et al. . |
| 5,409,787 | 4/1995 | Blayner et al. ............... 429/66 |
| 5,441,123 | 8/1995 | Beckley et al. . |
| 5,468,572 | 11/1995 | Zguris et al. . |
| 5,512,065 | 4/1996 | Kump et al. . |
| 5,593,796 | 1/1997 | Misra et al. . |
| 5,635,312 | 6/1997 | Yanagisawa et al. . |
| 5,731,099 | 3/1998 | Badger et al. . |

OTHER PUBLICATIONS

*Lead/Acid Recombination Batteries: Principles and Applications;* N.E. Gagshaw; Journal of Power Sources, 31 (1990); pp. 23–33. (No month available).

*History of Valve Regulated Lead Acid Batteries in the United States;* I.C. Bearinger, The Battery Man; Dec., 1992; pp. 30–35.

Hollingsworth & Vose Company Training Manual, Apr., 1997.

*Primary Examiner*—Maria Nuzzolillo
*Assistant Examiner*—Mark Ruthkosky

[57] ABSTRACT

This invention relates to a battery cell housing for valve-regulated, lead-acid batteries. The housing includes a tray base, vertical side walls attached to the base so that the tray base and vertical side walls define a single battery compartment. A top wall is secured to the side walls and has at least one opening. A compression member is positioned in the battery compartment beneath the top wall for movement between the side walls so as to compress a stack of battery cells stacked in a horizontal position in the battery compartment. At least one internally threaded member is included with the top wall and is aligned with at least one opening. At least one compression bolt extends through the top wall opening and contacts the compression member while threadedly engaging at least one internally threaded member.

26 Claims, 7 Drawing Sheets

COMPRESSED BATTERY SYSTEM FOR MOTIVE POWER APPLICATIONS

FIELD OF THE INVENTION

The present invention relates to battery cell tray assemblies for motive power applications. More particularly, the invention relates to a battery cell tray assembly having a variable-sized battery compartment for holding and compressing a stack of valve-regulated lead-acid battery cells in a horizontal position.

BACKGROUND OF THE INVENTION

For quite some time it has been known that lead-acid batteries are particularly suitable motive power applications involving "deep discharge" duty cycles. The term "deep discharge" refers to the extent to which a battery is discharged during service before being recharged. By way of counter example, a shallow discharge application is one such as starting an automobile engine wherein the extent of discharge for each use is relatively small compared to the total battery capacity. Moreover, the discharge is followed soon after by recharging. Over a large number of repeated cycles very little of the battery capacity is used prior to recharging.

Conversely, deep discharge duty cycles are characterized by drawing a substantial majority of the battery capacity before the battery is recharged. Typical motive power applications that require deep cycle capability include Class 1 electric rider trucks, Class 2 electric narrow isle trucks and Class 3 electric hand trucks. Desirably, batteries installed in these types of vehicles must deliver a number of discharges during a year that may number in the hundreds. The cycle life of batteries used in these applications typically can range from 500–2000 total cycles so that the battery lasts a number of years before it needs to be replaced.

Until recently, only lead-acid batteries of the flooded variety have been utilized for the aforementioned deep discharge applications. Flooded lead-acid batteries are designed to have an excess of electrolyte that floods the cell container, completely saturating the plate group and extending into the head space above the plate group to provide a reservoir. The electrolyte reservoir is necessary because as the battery is charged, water in the electrolyte is electrolyzed into oxygen and hydrogen gases, which escape from the cell and deplete the electrolyte volume. To make up for the loss of electrolyte, water must be periodically re-introduced into the cell, or the reservoir must be made large enough to compensate for the expected loss over the life of the battery.

More recently, valve-regulated lead-acid (VRLA) batteries have been introduced that are suitable for deep discharge applications. VRLA batteries rely upon internal gas recombination to minimize electrolyte loss over the life of the battery, thereby eliminating the need for re-watering. Internal gas recombination is achieved by allowing oxygen generated at the positive electrode to diffuse to the negative electrode, where it recombines to form water and also suppresses the evolution of hydrogen. The diffusion of oxygen is facilitated by providing a matrix that has electrolyte-free pathways. The recombination process is further enhanced by sealing the cell with a mechanical valve to keep the oxygen from escaping so it has greater opportunity for recombination. The valve is designed to regulate the pressure of the cell at a predetermined level, hence the term, "valve-regulated".

There are two commercially available technologies for achieving the enhanced oxygen diffusion. One technology makes use of a gelled electrolyte. In gel technology, the electrolyte is immobilized by introducing a gelling agent such as fumed silica. Gas channels form in the gel matrix in the early stages of the cell's life as water is lost via electrolysis. Once the gas channels are formed, further water loss is minimized by the recombination process. Unlike a fibrous matrix, the gel matrix keeps the electrolyte immobilized and there is little bulk movement.

The other technology for enhancing oxygen diffusion makes use of a fibrous material separator between the electrodes. A widely used material for this purpose is an absorbed glass mat (AGM). The AGM is a non-woven fabric comprised of glass micro-fibers that retain the electrolyte by capillary action, but also provide gas spaces as long as the matrix is not fully saturated with electrolyte. The electrolyte is still free to move within the matrix, but is more confined than in a flooded cell. Another fibrous material gaining acceptance is a non-woven mat constructed from a polymeric component such as polypropylene or polyethylene.

One important difference between the fibrous mat and gel technologies, stemming from the degree of electrolyte mobility, is the effect of cell orientation on cycle life. With fibrous mat technologies, particularly when dealing with cells over about 14 inches tall, it has been discovered that the cycle life in deep discharge applications can be significantly improved by arranging the cells horizontally rather than vertically. With gel technology, there is little difference in deep cycle life when cells are arranged horizontally or vertically. Thus, to achieve maximum cycle life, it is necessary to orient fibrous mat cells horizontally, but it is not necessary to orient cell gel cells horizontally. Presumably, this effect can be explained by stratification of the electrolyte in fibrous mat cells when subjected to deep discharge cycling due to the higher degree of mobility compared with gel technology. The stratification results in reduced discharge capacity and can only be reversed with great difficulty.

The benefits of valve-regulated, lead-acid cell batteries of the fibrous mat variety and plate arrangements for deep discharge applications are discussed in U.S. Pat. No. 4,425,412 to Dittmann et al. and U.S. Pat. No. 5,441,123 to Beckley. Although each of the inventions disclosed in these patents takes advantage of horizontal battery plate orientation, the inventions are not without their shortcomings. Dittmann discloses a "monobloc" battery wherein individual cells are not individually formed and enclosed within separate containers. Rather, they are formed by installing plates in a housing having separate cell compartments, and filling each compartment with acid. Individual cell compartments are defined within the battery case between partitions that are sealed to the battery case walls. A significant disadvantage of this approach is the lack of flexibility to adapt the battery configuration to battery compartments of different sizes. That is, a "monobloc" battery constructed with 12 cells will not fit into a battery compartment sized to accept six cells. Moreover, if an individual cell within the monobloc develops a problem, the entire monobloc may be rendered useless or at least significantly degraded in performance. Another disadvantage of the "monobloc" approach is that, for applications requiring large capacity batteries, battery size may increase substantially. This large, heavy battery may be difficult to handle thus raising safety concerns for personnel.

Some of these problems are addressed in Beckley which provides for the prefabrication of individual cells and the placement of individual cells in a preformed compartment in a steel tray assembly. The cell compartments are defined by cell-receiving members (partitions) attached to the tray. This approach is still somewhat limited in that no means are provided for applying compressive force to the cells, other than the fixed space between the partitions. Recent research has demonstrated the necessity of applying and maintaining modest to high levels of compression in fibrous mat cells to keep the separator in close contact with the plates. Having fixed partitions does not readily provide this capability.

In light of the problems with these prior art approaches, there remains a need for a valve-regulated lead-acid battery housing that takes advantage of horizontal orientation performance and that provides individual battery cells, while providing a convenient means of applying an appropriate amount of compression to each cell.

SUMMARY OF THE INVENTION

The present invention relates to a unique and improved housing intended for valve-regulated lead-acid (VRLA) batteries used for motive power applications. Toward this end there is provided a shelfless housing having a single compartment for holding a stack of separately formed cells containing horizontally oriented plates. There are no horizontal partitions, only a single compartment. Proper compression for each cell making up the stack is provided by suitably sizing the compartment in relation to the cell stack dimensions or, preferably, by introducing a compression member positioned in the upper portion of the housing. This arrangement eliminates the need to provide multiple cell compartments for individual cells and any associated dividing members. Desirably, the compression member is positioned atop the stack of battery cells and is biased against the stack so as to provide proper compression. Any simple, mechanical means for biasing the compression member against the stack of cells may be used in the practice of the present invention.

Accordingly, it is an object of the present invention to make VRLA batteries easier to use.

Another object of the present invention is to provide users of VRLA batteries more flexibility to create varying battery package configurations than is possible using prior art approaches.

Still another object of the present invention is to facilitate the use of horizontally oriented VRLA batteries in a variety of configurations while providing compression for each of the configurations in a simple manner.

One aspect of the present invention is a single shelfless battery compartment in which a stack of horizontally oriented cells is treated as a single unit for compression purposes.

Another aspect of the present invention is to provide a single battery compartment with a compression member that bears against the stack of VRLA batteries.

Still another aspect of the present invention is to size a single shelfless battery compartment so that the vertical dimension of the compartment is less than the height of an uncompressed stack of battery cells.

These and other objects and aspects of the present invention will become apparent to those skilled in the art after a reading of the following description of the preferred embodiments when considered in conjunction with the drawings. It should be understood that both the foregoing general description and the following detailed description are exemplary and explanatory only and are not restrictive of the invention as claimed. The accompanying drawings, which are incorporated in and constitute a part of this specification, illustrate one embodiment of the invention and, together with the description, serve to explain the principles of the invention.

BRIEF DESCRIPTION OF THE DRAWINGS

The above and other objects, features, and advantages of the present invention will become more apparent and will be readily appreciated from the following detailed description of the preferred embodiments of the invention taken in conjunction with the accompanying drawings, in which.

DETAILED DESCRIPTION OF THE PREFERRED EMBODIMENT

Figure 1:
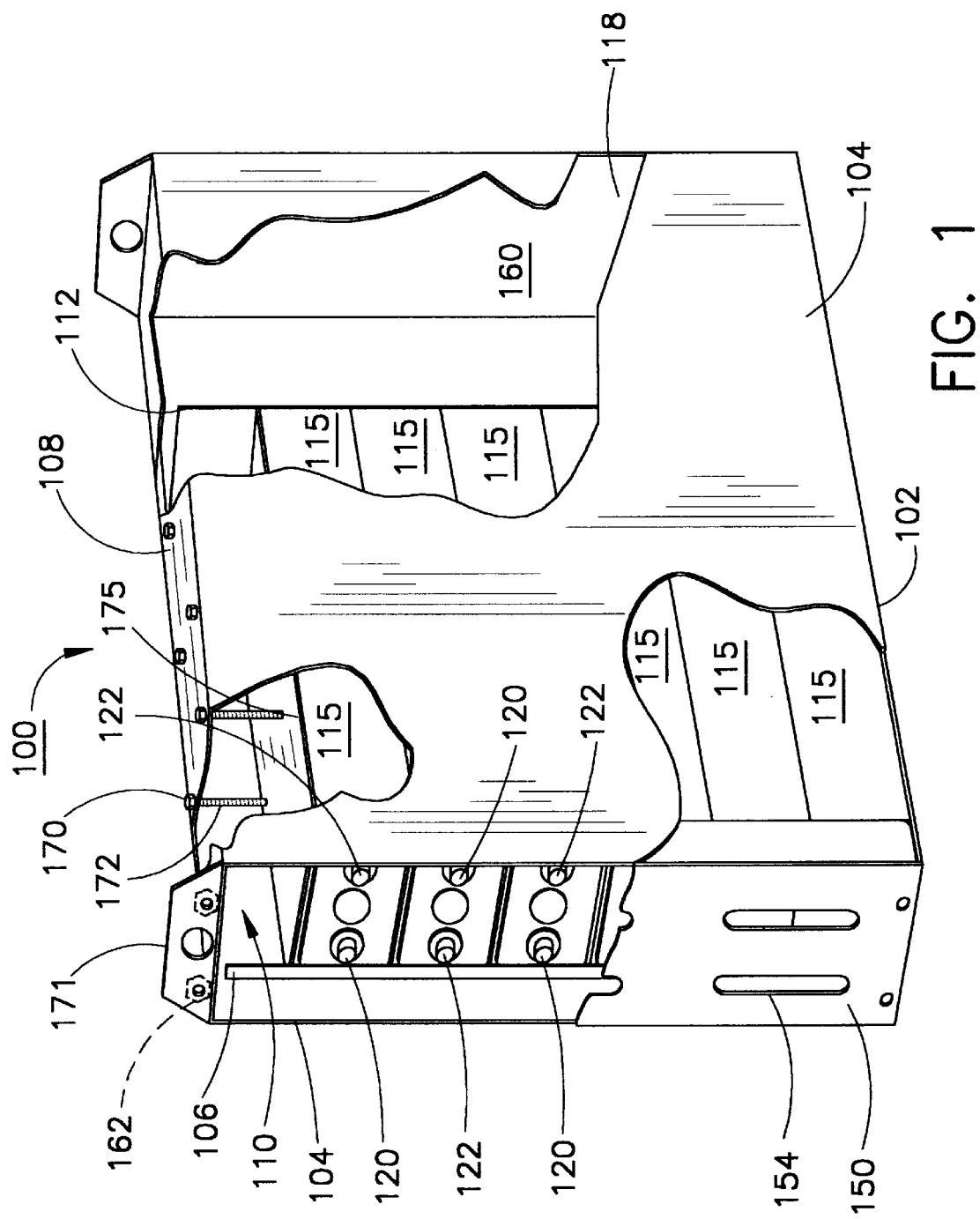
FIG. 1 is a front perspective elevational view of a 6-cell battery system of the present invention.
Figure 2:
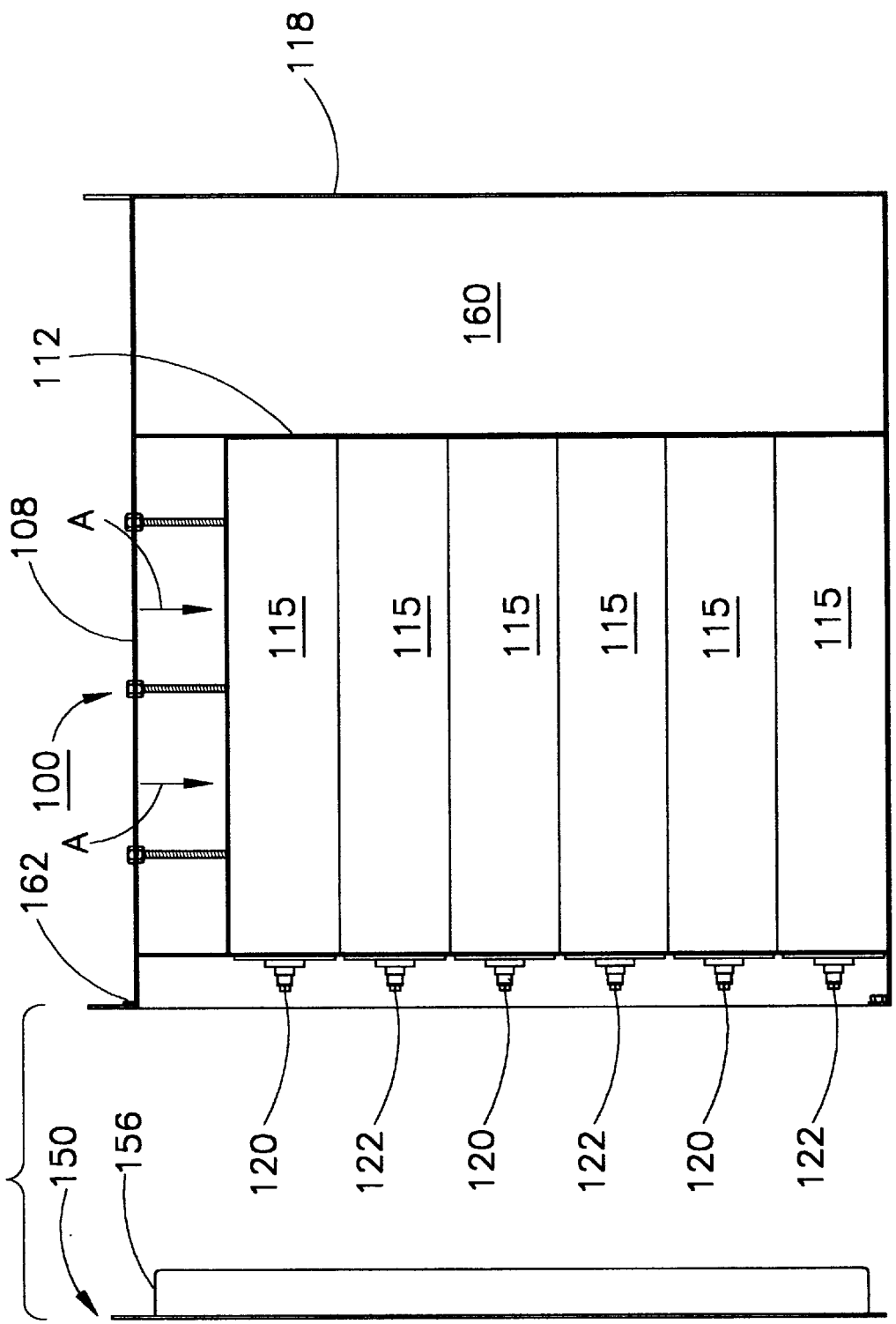
FIG. 2 is a side view of the battery system of FIG. 1.

As illustrated in FIGS. 1 and 2, the battery system includes a housing 100. In accordance with a first embodiment of the present invention the housing 100 includes a base 102 and vertical side walls 104 that together with rear wall 112 define a single battery compartment 110. A compression member 175 is positioned in the battery compartment 110 below a top wall 108 and between the vertical side walls 104 for vertical movement therebetween. The top wall 108 includes cable openings (not shown) to permit the battery cables to be routed to the external electrical equipment powered by the battery system.

Front cover 150 protects the battery cell terminals and includes vent openings 154 to provide proper battery cell ventilation. The vent openings 154 also are positioned to provide access to battery terminals 120,122 for testing. Front cover 150 further includes rails 156 (FIG. 2) that extend into battery compartment 110 to help hold the battery cells 115 in place. The term "cell" as used herein refers to a single electrochemical unit including multiple positive and negative plates with separators therebetween. Each unit is assembled in a separate container or casing and is electrically connected to other cells at a point outside of the casing via the terminals.

Figure 3:
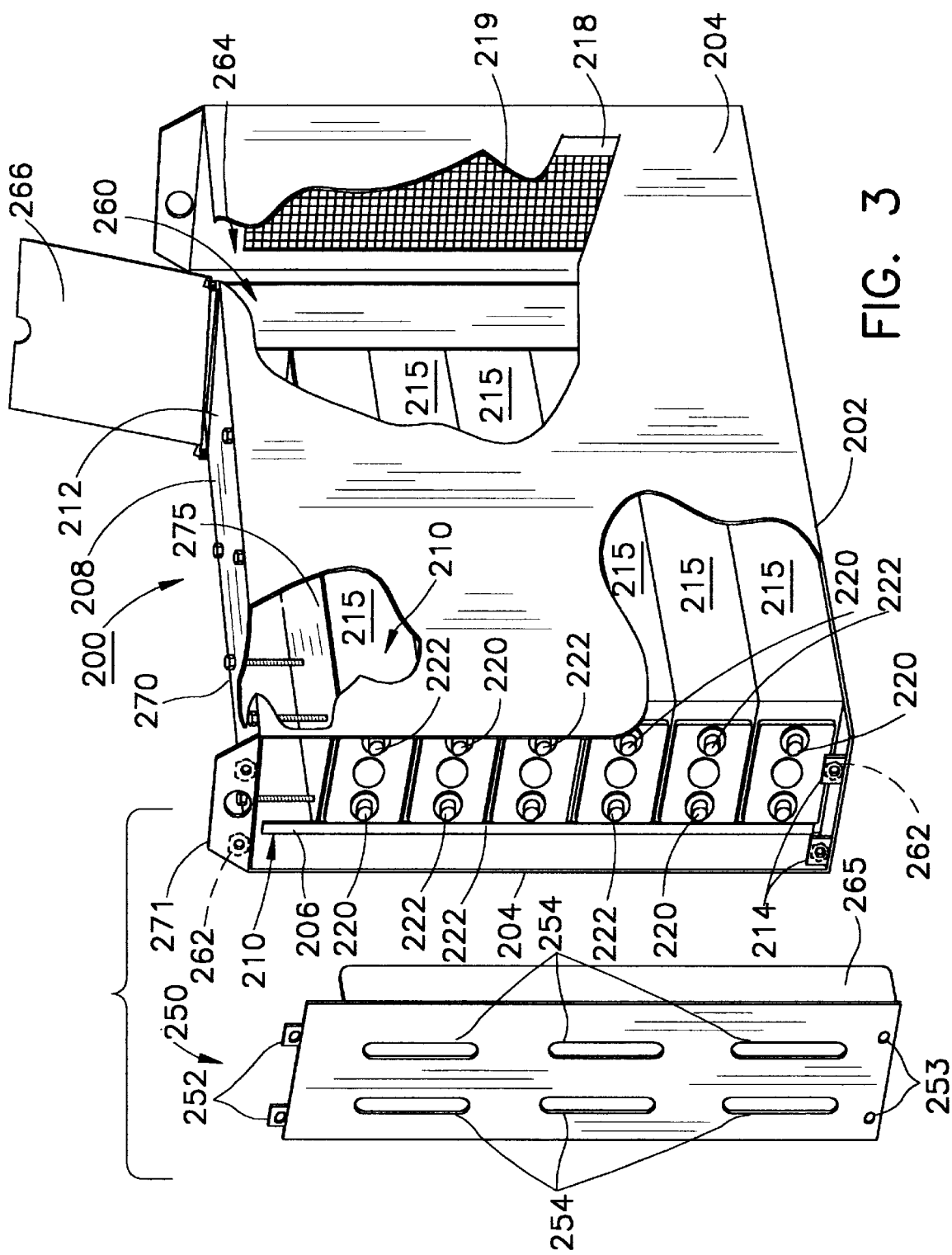
FIG. 3 is a front perspective view of a 6-cell battery system according to a first alternative approach.

Referring now to FIG. 3, the front cover 250 is secured to the housing 200 in any suitable manner, as for example, with 4 bolts (not shown) that extend through front cover tabs 252 to engage nuts 262 welded to lifting ear 271, and through holes 253 to engage nuts 262 welded to the backside of base tabs 214. The front cover of this alternative embodiment further includes vent openings 254 and rails 256 as was discussed above. The front covers of the other embodiments are secured to the housings in similar fashion.

Outer rear wall 118 is secured to extensions of top wall 108, base 102, and side walls 104 beyond battery compartment rear wall 112. Housing 100 includes a space 160 between battery compartment rear wall 112 and outer rear wall 118. This double wall arrangement is provided so that the outside dimensions of the housing 100 match those of battery compartments used in lift trucks, pallet jacks and the like. It should be understood that, depending on the width of the cells 115, a spacer 106 may be provided inward of and parallel to the vertical walls 104 to hold the cells in place.

An alternative embodiment of the battery system is illustrated in FIG. 3. This embodiment includes a battery charger compartment 264 adjacent space 260. Access to the compartment is provided via hinged cover 266. The space 260 between the battery compartment 210 and the battery charger compartment 264 typically is smaller than that in the embodiment described above. Ventilation openings 219 are provided in outer rear wall 218 to provide for proper cooling of the battery charger.

This embodiment further includes a battery compartment 210 formed by a base 202 and side walls 204. A compression member 275 is positioned between side walls 204 and cooperates with compression bolts 270 extending through top wall 208 to provide proper compression for the stack of battery cells 215. A spacer 206 may be provided to perform the functions described above. The individual cells 215 are arranged to have alternating battery terminals 220, 222 as is well known in the art.

Each of the embodiments described above accepts six horizontal battery cells 115, 215 arranged in at least one single stack in battery compartment 110, 210. The VRLA cells 115, 215 require proper compression between the plates and separators therein to provide maximum performance. If proper compression is not applied, it is possible that the batteries located near the bottom of the stack may perform differently from those located near the top of the stack. One approach to solving the compression problem is to size the compartments 110, 210 to be less than the uncompressed height of the stack of cells 115, 215. In this approach, the vertical height of the battery compartment 110 would be chosen to be less than the uncompressed height or equal to the compressed height of the stack of battery cells 115, 215. The compressed height of each cell and, accordingly, the cell stack is judiciously sized to be slightly less than, equal to, or slightly greater than the nominal dimension of the cell jar, depending on the desired level of compression. As will be readily appreciated by one of ordinary skill, the cells typically are manufactured to have flexible thermoplastic side walls. Polypropylene is a commonly used material for this application. The side walls provide a sufficient amount of flexure to permit the cells to be compressed properly.

Figure 5:
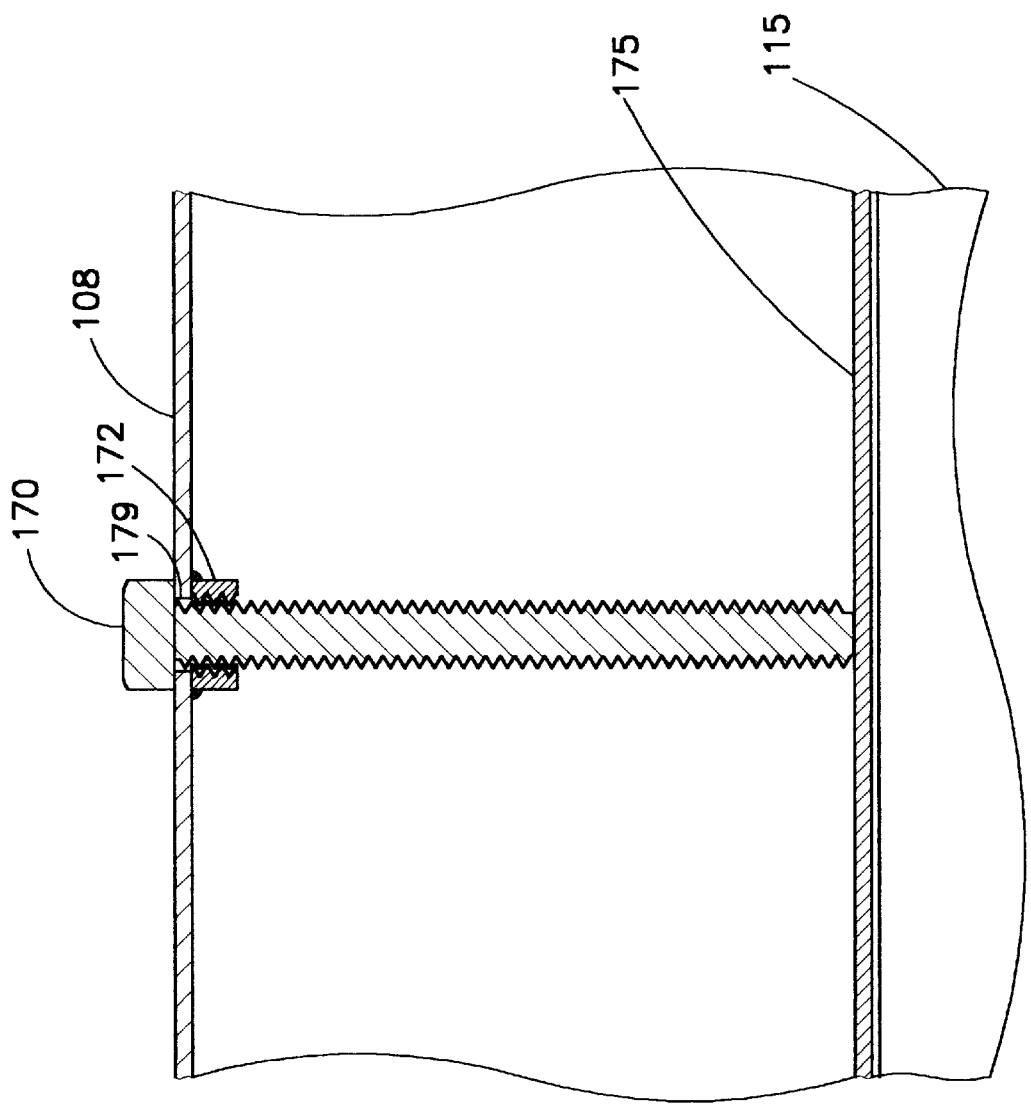
FIG. 5 is a partial cut away view illustrating the installation and operation of the compression bolt as it is used to bias the compression member against a stack of battery cells in the battery compartment.

A preferred embodiment of the present invention addresses the need for compression by providing a means for effecting a prescribed downward pressure against the stack of lead-acid battery cells. That is, the stack of cells is treated as a single unit. One component of the means for effecting a prescribed downward pressure is the compression assembly illustrated in FIGS. 1, 2 and 5. Compression plate 175 is free to move upwardly and downwardly inside the battery compartment 110 between the vertical side walls 104. The means for effecting a prescribed downward pressure further includes a biasing mechanism for pressing the compression plate downwardly in the directions of arrows "A" (FIG. 2) against the stack of lead-acid cells 115. Any simple mechanical device capable of exerting a downward biasing force against compression plate 175 may be used in the practice of the present invention as a biasing mechanism. In a preferred embodiment top cover 108 is provided with at least one and, preferably, a plurality of openings 179 (FIG. 5) through which extend compression bolts 170. Each compression bolt engages and is pulled downwardly by internally threaded member 172 secured to the underside of top cover 108. The internally threaded member 172 is aligned with the opening 171 to permit passage of the compression bolt 170. In a preferred embodiment internally threaded member 172 may comprise a nut that has been welded to the underside of top cover 108. It will be readily that a specially machined member may be used for this function in an equivalent fashion.

The number of compression bolts 170 provided to bias compression plate 175 against the stack of lead-acid battery cells 115 may vary depending on the size of the battery cells 115. In a preferred embodiment four compression bolts are provided, although it is believed that, depending on battery performance, six compression bolts may be used. The number of compression bolts 170 used should be chosen to insure that compression plate 175 remains substantially flat along the length of the top battery cell in the stack. In a preferred embodiment, the top cover may be provided with a plurality of openings and associated internally threaded members so that compression bolts may be installed as needed to provide proper compression depending on the size and number of cells in the stack.

It will be readily appreciated that there are other alternatives for providing a threaded engagement for the compression bolts 170. By way of non-limiting example, the opening 179 (FIG. 5) in the top cover 108 could be internally threaded thereby eliminating the need for threaded member 172. Alternatively, the opening 179 could be fitted with an internally threaded bushing (not shown) for threaded engagement with the compression bolt 170.

Desirably compression member 175 is sized so as to have substantially the same surface area as that of the top surface of the battery cell stack. Clearance should be provided between the compression member and the battery compartment walls so that the compression member will move downwardly without binding against side walls 104. In a preferred embodiment, a space of between about 0.06 and 0.125 inches is provided between the edge of compression member 175 and vertical side walls 104. Other clearance dimensions may be used provided that sufficient room is provided between side walls 104 for uninterrupted vertical movement by the compression member even if during such movement there is contact between the compression member 175 and side walls 104. With respect to other physical characteristics, the compression member 175 must have sufficient thickness and strength to carry the loads associated with proper compression without deformation. Although the compression member 175 is shown constructed as a one-piece construction, the scope of the present invention includes using a multiple-piece construction as needed.

The length of the compression bolts 170 should be selected such that, when the bolts are fully extended through internal threaded member 172, the bolt head contacts top cover 108. When properly positioned the bolt 170 will have an exposed length extending below top cover 108. This exposed length should exceed the distance between the top surface of the compression member 175 and the underside of top wall 108 as measured for an uncompressed stack of battery cells 115. This desired exposed length helps to ensure that compression may be effected. A lock washer (not shown) may be provided between the bolt head and top cover 108 to prevent the bolts from loosening due to vibration.

As stated above, the means for applying positive pressure to the stack of battery cells 115,215 may include any suitable mechanical device capable of biasing the compression member against the stack of battery cells. By way of non-limiting example, springs could be installed in the head space between the compression member 175 and tope cover 108. The spring constant of the springs would be selected to provide appropriate compression. Alternatively, a lever-operated cam assembly could be provided above compression member. The advantage of this approach is that the compression member 175 may be secured into position quickly. Yet another approach would use hydraulic or pneumatic cylinders in the space between the compression member 175 and top cover 108. Two other approaches include using an inflatable bladder or a scissors-type mechanism similar to a car jack. Alternatively, the top cover 108 could be hingedly attached to the outer rear wall 118 so as to be rotatable into a closed position atop the stack of cells. One particularly simple approach is to increase the weight of compression member until it exerts a sufficient downward force to provide proper compression for the stack of batteries. The advantages of this approach include: 1) the elimination of any need for maintenance on the biasing mechanism; 2) the requirement for only one part to provide compression and 3) the ability to vary the amount of compression easily by varying the size of a single compression member. Alternatively, a plurality of compression members of different weights may be combined as needed to achieve a particular amount of downward force. It will be readily understood that the top wall and the compression plate 175 would be a single piece in this approach. The scope of the present invention includes these and any other equivalent structure as those equivalents would be understood by one of ordinary skill.

It should be recognized that sizing the battery compartment 110 to have a vertical height dimension equal to the compressed height of the stack of battery cells 115 is itself one form of a means for effecting a prescribed downward pressure against the stack of battery cells 115.

The battery system of the present invention provides many advantages over prior art approaches. As an example, the shelfless housing is more economical to manufacture and facilitates loading of the individual cells 115. The housing is rotated about its bottom rear edge 90 degrees so that it rests on the outer rear wall 118. The opening of the battery compartment 110 then points upwardly. Individual battery cells are inserted into the housing one by one until the desired number of cells has been installed. Compression member 175 is placed in the battery compartment 110 against the uncompressed cell stack. Preferably, the compression bolts 170 are inserted and tightened while the housing is resting on outer rear wall 118. Thus, when the housing is rotated to rest on tray base the cells are already properly compressed. The present invention provides other advantages that will be readily apparent to one of ordinary skill but that are not mentioned herein. Moreover, the present invention provides solutions to problems that may not be mentioned here, but that will be recognized by one of ordinary skill.

Figure 4:
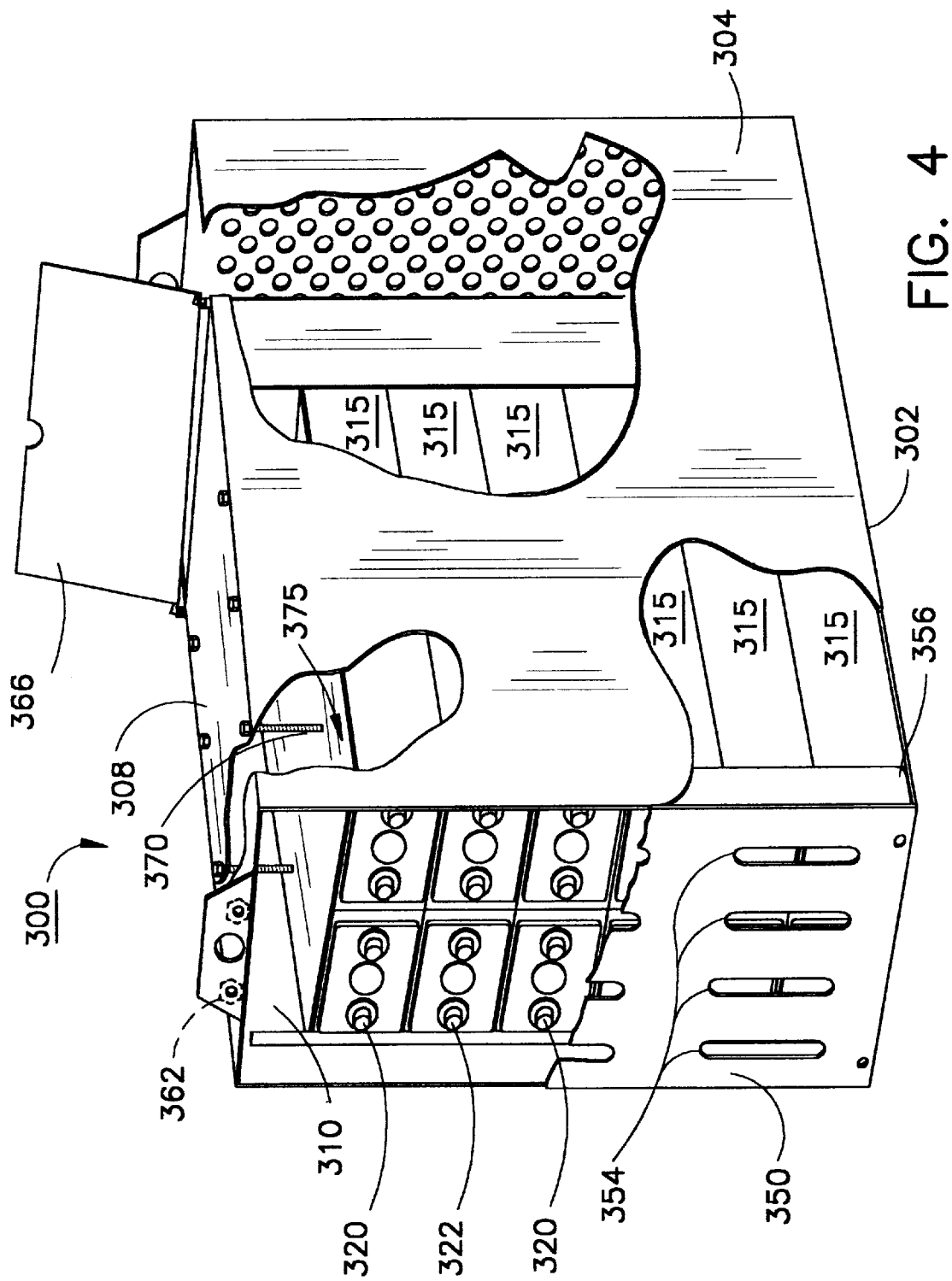
FIG. 4 is a front perspective view of a 12-cell battery system according to a second alternative approach.
Figure 6:
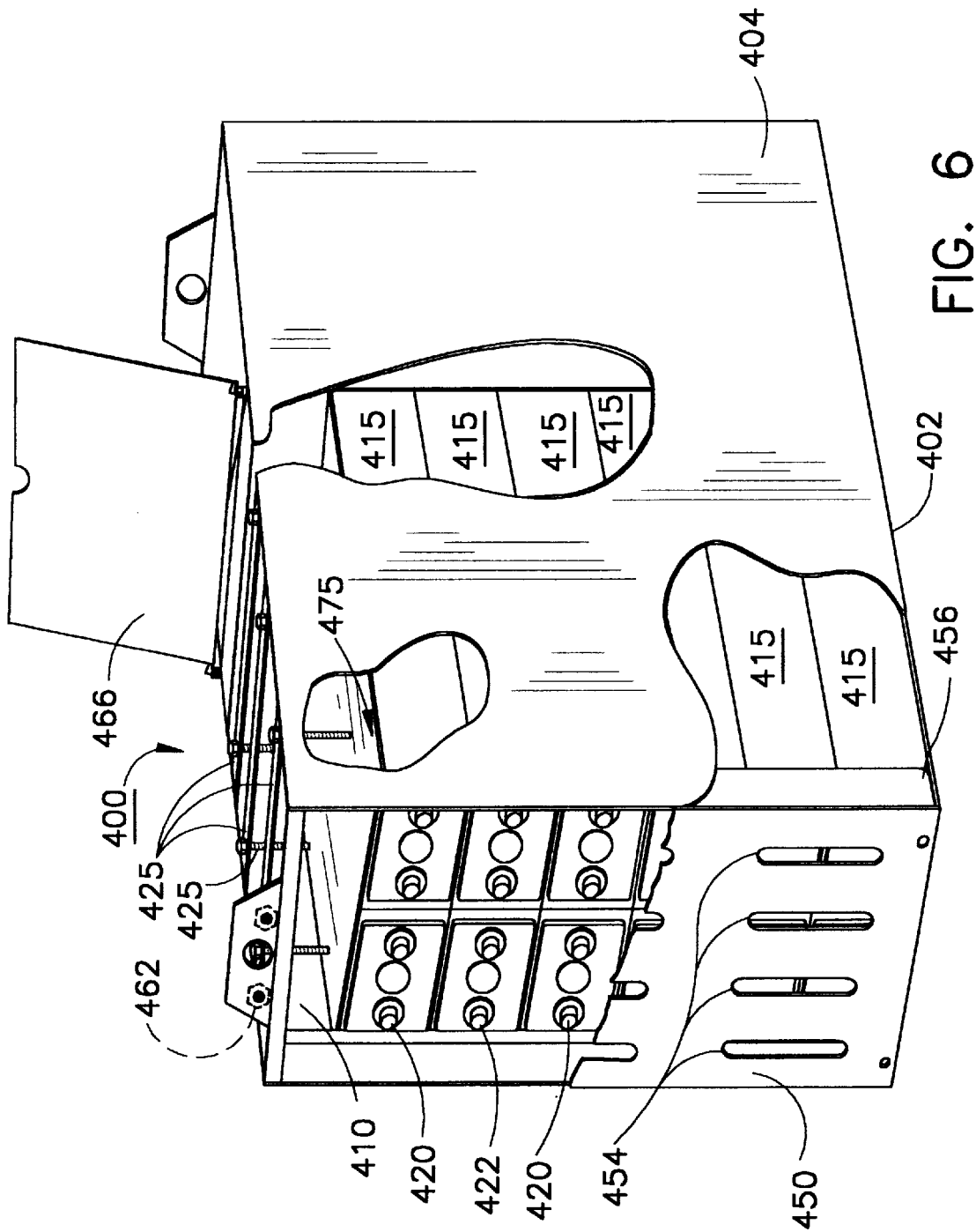
FIG. 6 illustrates an open top embodiment of the battery system of the present invention.

Although the preferred embodiments depicted in the FIGS. 1–3 each show a single stack of battery cells 115, 215 comprised of 6 cells, other configurations may be used depending on the voltage requirements for a particular application. An alternative arrangement for a 12-cell tray assembly 300 is shown in FIGS. 4 and 6. As seen in FIG. 4, this embodiment includes a base 302, vertical side walls 304 and top wall 308. The battery compartment 310 in this embodiment is sized to accommodate two side-by-side stacks of six battery cells 315 having terminals 320,322. Compression member 375 is positioned between vertical side walls 304 to provide proper compression for the battery cells 315. Although this embodiment is shown provided with six 4 compression bolts 370, additional compression bolts 370 may be provided as needed to insure proper battery cell performance. Front cover 350 is provided with an appropriate number of vent openings 354 to accommodate the additional battery cells 315. Front cover 350 further includes rails 356 that have the same configuration and that serve the same function as was the case with the embodiments discussed above. The front cover 350 is secured to the housing 300 using welded nuts 362 in similar fashion to that described above. This embodiment may include a battery charger compartment provided with a hinged cover 366 as was discussed above. It will be readily appreciated that other numbers and sizes of battery cells may be accommodated by varying the size of the battery compartment and the compression member as needed. For example, 18, 24, 36 or more cells may be accommodated by increasing the size of the shelfless housing as needed.

Referring now to FIG. 6, an alternative embodiment 400 having an open top is illustrated. This embodiment includes a base 402, side walls 404, a battery compartment 410 and a hinged cover 466. The two stacks of cells 415 are arranged side-by-side with alternating terminals 420,422. Front cover 450 includes vent openings 454 and rails 456 and is secured to housing 400 using bolts (not shown) and nuts 462.

In this embodiment the top cover 108 is eliminated completely. At least one cross beam 425 would be mounted on the side walls 404 so as to span the gap therebetween. The cross beams 425 would be provided with threaded openings or some type of threaded member for receiving the compression bolts 170. This approach could be incorporated in any of the embodiments illustrated in the Figures and offers weight savings as a solid top is not provided on the housing 400.

Figure 7:
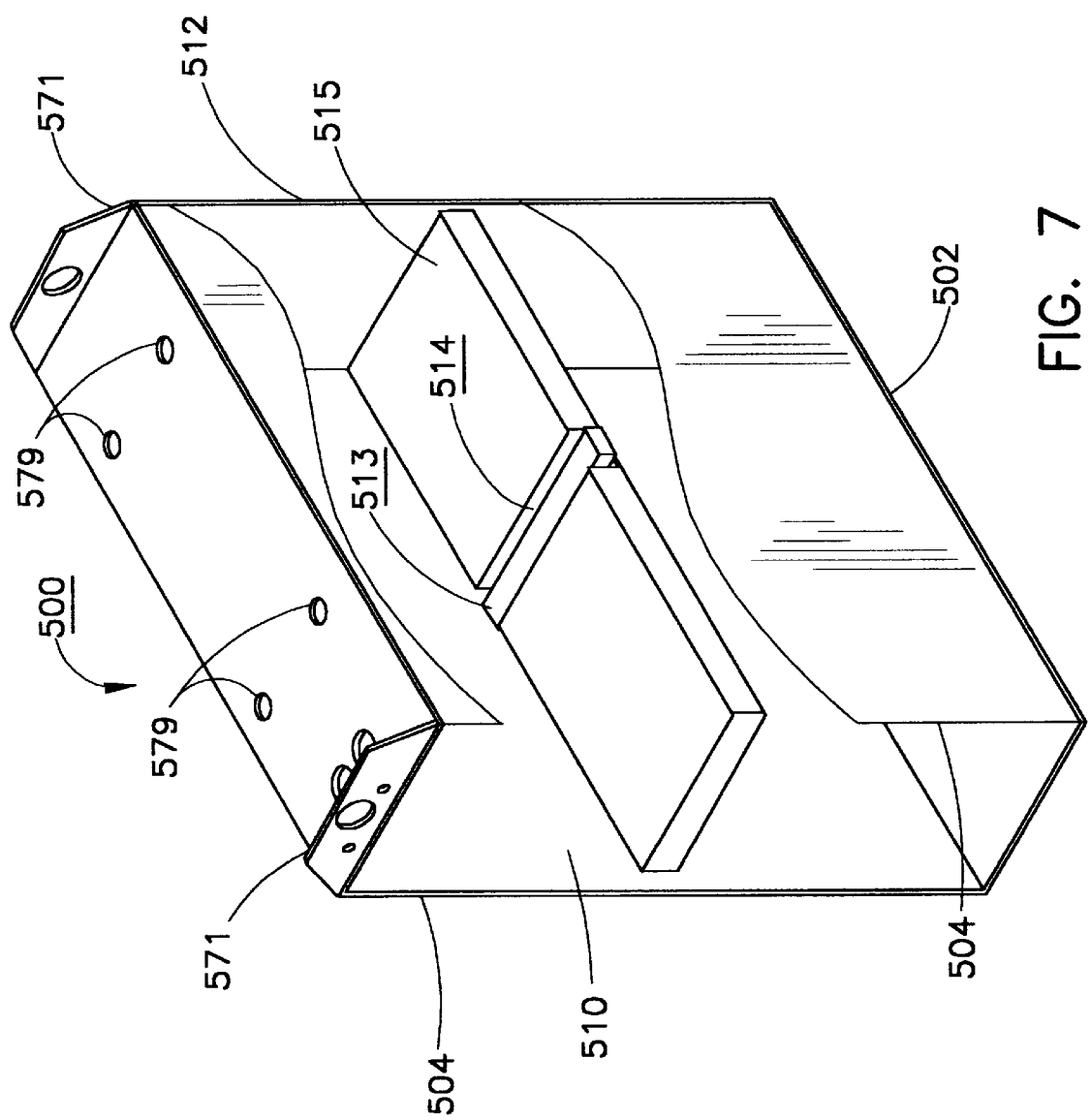
FIG. 7 illustrates an alternative embodiment of the present invention that includes a constraint member to address battery compartment side wall bulging.

Referring now to FIG. 7, in certain housing configurations having a relatively large battery compartment vertical dimension, it may be necessary to take steps to prevent the side walls 104 from bulging outwardly after the stack of battery cells has been compressed. One approach to address this bulging is to increase the thickness of the side walls 504. That approach, while potentially successful, does require additional expense and tends to increase the overall width and weight of the battery assembly. An alternative approach is to constrain the side walls so as to hold them in a substantially vertical position. FIG. 7 is an isometric, partial cutaway view of a housing 500 illustrating a side wall constraint member 513 that may comprise a flat bar, rod, strap or equivalent structure attached to each side wall 504 and spanning the width of the battery compartment 510. The constraint member is secured at each end to the side walls 504. Used alone, the constraint member 513 would contact the cells directly above and below it. The compressive force applied to the stack of battery cells could cause the constraint member 513 to generate unacceptable point loading on those cells. Accordingly, a floating plate 515 is positioned between side walls 104 and underneath the constraint member 513 to prevent the constraint member 513 from making direct contact with the cells immediately above and below the constraint member 513. The floating plate 515 is not attached to the side walls 504 or to the rear wall 512. Thus, it is free to move vertically as the battery cells are compressed. In order to conserve space within the battery compartment 510 the constraint member 513 is positioned in a recess 514 in the floating plate 515. The depth of the recess 514 should be selected such that, when the stack of battery cells is compressed fully, the top surface of the floating plate 515 is above the top surface of the constraint member 513. The floating plate 515 may be constructed of metal or, more preferably, from a thermoplastic material to conserve weight. Because the floating plate 515 is substantially non-load bearing, its thickness need be only that necessary to protect the battery cell immediately below it from potential point loading by the constraint member 513.

The constraint member 513 desirably is constructed from metal. Alternatively, a fabric strap constructed using well known high strength fibers may be used. Non-limiting examples of such fibers include aramids such as that sold under the Kevlar® brand and ultra high molecular weight polyethylenes such as that sold under the Spectra® brand. Straps constructed from these materials can have strength values similar to those of metals and can provide weight savings.

Although FIG. 7 shows a single constraint member, it will be readily appreciated that two or more constraint members may be used depending on the extent of the bulging expected. The vertical positioning of the constraint members may be varied within the battery compartment 510 between base 502 and top cover 508 as needed. Desirably, the constraint members would be positioned near the point of the greatest amount of bulging.

This constraint member and floating plate arrangement is not intended to act as a shelf for dividing the battery compartment into multiple compartments. Rather the function of this arrangement is to reinforce the walls of the housing. The constraint member is positioned such that it is not supporting the weight of the cells above it. In this manner, the cell stack is still treated as a single unit. The need for a side wall constraint will vary depending on the number of cells in the stack and the thickness of the side walls. Making the determination to include a constraint is within the ability of one of ordinary skill. It will be readily appreciated that a combination of increasing wall thickness and providing a constraint member may be used to address side wall bulging. The scope of the present invention includes using other structures and means for reinforcing the walls of the housing to prevent bulging.

It will be appreciated that in each of the embodiments described above the individual cells 115, 215, 315, 415 will be connected as necessary and as is well known in the art to provide the proper voltage. The details of those connections have been omitted from the drawings for the purposes of clarity. Each of these embodiments may also include cable access openings (not shown) as needed in the battery compartment top wall to provide an exit point for battery cables connected to the cells.

Although the present invention has been described with preferred embodiments, it is to be understood that modifications and variations may be utilized without departing from the spirit and scope of this invention, as those skilled in the art will readily understand. Such modifications and variations are considered to be within the purview and scope of the appended claims and their equivalents.

What is claimed is:

1. A battery system for battery powered vehicles which utilize valve-regulated, lead-acid cells, each cell being of the type that includes multiple positive and negative plates with separators therebetween assembled in a separate casing having exterior terminals outside the casing whereby the cells may be electrically interconnected and flexible walls that bulge outwardly when initially filed with electrolyte and uncompressed, said system comprising:

a) a shelfless battery compartment having a base, a top wall, a pair of side walls and a rear wall;
b) at least one vertical stack containing at least three of said separately cased cells so positioned in said compartment that said positive and negative plates are horizontally oriented;
c) each of said separately cased cells in said stack bearing against at least one other separately cased cell;
d) the distance between the top wall and bottom wall of said compartment being less than the combined vertical dimension of the stack of said separately cased cells when initially filled with electrolyte and uncompressed;
e) whereby a pressure to insure an initial contact is established between the plates and separators.

2. The battery system of claim 1 further comprising a constraint member for maintaining the side walls of said compartment in a substantially vertical position.

3. The battery system of claim 2 wherein the constraint member is attached to each side wall so as to span the width of the shelfless battery compartment without acting as a shelf for dividing the battery compartment into multiple compartments.

4. The battery system of claim 1 wherein the battery compartment is sized to accept a single stack of up to about 12 battery cells.

5. The battery system of claim 1 wherein the battery compartment is sized to accept at least two side-by-side stacks each stack containing up to about 6 battery cells.

6. The battery system of claim 3, wherein the constraint member comprises a bar attached to each side wall of said battery compartment and spanning the width of said compartment and further including a floating plate positioned between side walls and associated with said constraint member to prevent said constraint member from making direct contact with the cells immediately above and below said constraint member, said floating plate being unattached to the side walls or to the rear wall and thus free to move vertically as the battery cells are compressed.

7. A battery system for battery powered vehicles which utilize valve-regulated, lead-acid cells, each cell being of the type that includes multiple positive and negative plates with separators therebetween assembled in a separate casing having exterior terminals outside the casing whereby the cells may be electrically interconnected and flexible walls that bulge outwardly when initially filled with electrolyte and are uncompressed, said system comprising:

a) a shelfless battery compartment having a base, a top wall, a pair of side walls and a rear wall;
b) at least one vertical stack containing at least three of said separately cased cells so positioned in said compartment that said positive and negative plates are horizontally oriented;
c) each of said separately cased cells in said stack bearing against at least one other separately cased cell;
d) a compression plate positioned in said compartment atop said vertical stack of separately cased cells and a biasing mechanism for pressing the compression plate downwardly;
e) whereby a pressure to insure an initial contact is established between the plates and the separators.

8. The battery system of claim 7 wherein the biasing mechanism comprises;
i) at least one threaded opening in the top of said battery compartment; and
ii) at least one threaded compression bolt extending through the battery compartment opening so as to exert a biasing force against the compression member.

9. The battery system of claim 7 further comprising a constraint member for maintaining the side walls of said compartment in a substantially vertical position.

10. The battery system of claim 9 wherein the constraint member is attached to each side wall so as to span the width of the shelfless battery compartment.

11. The battery system of claim 10 wherein the constraint member comprises a bar attached to each side wall of said battery compartment and spanning the width of said compartment and further including a floating plate positioned between side walls and associated with said constraint member to prevent said constraint member from making direct contact with the cells immediately above and below said constraint member, said floating plate being unattached to the side walls or to the rear wall and thus free to move vertically as the battery cells are compressed.

12. The battery system of claim 7 wherein the battery compartment is sized to accept a single stack of up to about 12 battery cells.

13. The battery system of claim 7 wherein the battery compartment is sized to accept at least two side-by-side stack, each stack containing up to about 6 battery cells.

14. A housing for receiving one or more stacks of at least three valve regulated, lead-acid cells in a battery assembly for battery powered vehicles, each cell being of the type that includes multiple positive and negative plates with separators therebetween assembled in a separate casing having exterior terminals outside the casing whereby the cells may be electrically interconnected and flexible walls that bulge outwardly when initially filled with electrolyte and uncompressed, said housing comprising:

a) a shelfless battery compartment having a base, a top wall, a pair of side walls and a rear wall;

b) the distance between the top wall and bottom wall of said compartment being less than the combined vertical dimension of the prescribed stack of said separately cased cells when initially filled with electrolyte and uncompressed;

c) whereby a pressure to establish an initial contact is established between the plates and separators when the cells are assembled into the housing.

15. The battery system of claim 14 further comprising a constraint member for maintaining the side walls of said compartment in a substantially vertical position.

16. The battery system of claim 15 wherein the constraint member is attached to each side wall so as to span the width of the shelfless battery compartment.

17. The battery system of claim 16 wherein the constraint member comprises a bar attached to each side wall of said battery compartment and spanning the width of said compartment and further including a floating plate positioned between side walls and associated with said constraint member to prevent said constraint member from making direct contact with the cells immediately above and below said constraint member, said floating plate being unattached to the side walls or to the rear wall and thus free to move vertically as the battery cells are compressed.

18. The battery system of claim 14 wherein the battery compartment is sized to accept a single stack of up to about 6 battery cells.

19. The battery system of claim 14 wherein the battery compartment is sized to accept at least 2 side-by-side stacks, each stack containing up to about 6 battery cells.

20. A housing for receiving one or more stacks of at least three valve regulated, lead-acid cells in a battery assembly for battery powered vehicles each cell being of the type that includes multiple positive and negative plates with separators therebetween assembled in a separate casing having exterior terminals outside the casing whereby the cells may be electrically interconnected and flexible walls that bulge outwardly when initially filled with electrolyte and uncompressed, said housing comprising:

a) a shelfless battery compartment having a base, a top wall, a pair of side walls and a rear wall;

b) a compression plate so positioned in the upper portion of said compartment as to rest atop said vertical stack of separately cased cells when assembled, and a biasing mechanism for pressing the compression plate downwardly, c) whereby a pressure to establish an initial contact is established between the plates and separators when the cells are assembled into the housing.

21. The battery housing according to claim 20 wherein the biasing mechanism comprises:

i) at least one threaded opening in the top of said battery compartment;

ii) at least one threaded compression bolt extending through the battery compartment opening so as to exert a biasing force against the compression member.

22. The battery system of claim 20 further comprising a constraint member for maintaining the side walls of said compartment in a substantially vertical position.

23. The battery system of claim 22 wherein the constraint member is attached to each side wall so as to span the width of the shelfless battery compartment.

24. The battery system of claim 23 wherein the constraint member comprises a bar attached to each side wall of said battery compartment and spanning the width of said compartment and further including a floating plate positioned between side walls and associated with said constraint member to prevent said constraint member from making direct contact with the cells immediately above and below said constraint member, said floating plate being unattached to the side walls or to the rear wall and thus free to move vertically as the battery cells are compressed.

25. The battery system of claim 20 wherein the battery compartment is sized to accept a single stack of up to about 12 battery cells.

26. The battery system of claim 20 wherein the battery compartment is sized to accept at least 2 side-by-side stacks, each stack containing up to about 6 battery cells.

* * * * *